United States Patent
Takenaka et al.

(10) Patent No.: US 10,826,397 B2
(45) Date of Patent: Nov. 3, 2020

(54) SWITCHING POWER SUPPLY OPERABLE IN AN INTERMITTENT DRIVING MODE

(71) Applicant: Rohm Co., Ltd., Kyoto (JP)

(72) Inventors: Seiji Takenaka, Kyoto (JP); Masashi Nagasato, Kyoto (JP); Tetsuo Tateishi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/374,929

(22) Filed: Apr. 4, 2019

(65) Prior Publication Data

US 2020/0076310 A1 Mar. 5, 2020

(30) Foreign Application Priority Data

Sep. 3, 2018 (JP) .................................. 2018-164148
Sep. 26, 2018 (JP) .................................. 2018-179904
Dec. 10, 2018 (JP) .................................. 2018-230997

(51) Int. Cl.
*H02M 3/158* (2006.01)
*H02M 3/156* (2006.01)

(52) U.S. Cl.
CPC ....... *H02M 3/1588* (2013.01); *H02M 3/1563* (2013.01); *Y02B 70/1466* (2013.01)

(58) Field of Classification Search
CPC ....... H02M 3/156–158; H02M 3/1563; H02M 3/1588; H02M 1/32; H02M 1/36; H02M 3/1582; H02M 3/1584; G05F 1/00; G05F 1/46; G05F 1/56; G05F 1/565; Y02B 70/1466
USPC .................................. 323/222, 271, 282, 288
See application file for complete search history.

(56) References Cited

U.S. PATENT DOCUMENTS

| | | | | |
|---|---|---|---|---|
| 7,595,624 | B2* | 9/2009 | Tateishi | H02M 3/158 323/271 |
| 7,868,598 | B2* | 1/2011 | Ishino | H02M 3/1563 323/222 |
| 9,276,473 | B1* | 3/2016 | Chen | H02M 3/158 |
| 2003/0231011 | A1* | 12/2003 | Umemoto | H02M 1/38 323/284 |
| 2004/0169979 | A1* | 9/2004 | Pai | H02M 3/1588 361/93.1 |
| 2008/0246455 | A1* | 10/2008 | Chu | H02M 3/1588 323/283 |

(Continued)

FOREIGN PATENT DOCUMENTS

| JP | 2010-088218 | 4/2010 |
|---|---|---|
| JP | 2017-107551 | 6/2017 |

*Primary Examiner* — Yemane Mehari
(74) *Attorney, Agent, or Firm* — Fish & Richardson P.C.

(57) ABSTRACT

A switching power supply includes: a switching output circuit configured to generate an output voltage from an input voltage by charging a capacitor by turning on and off an output transistor; a control circuit configured to halt the driving of the switching output circuit when charging electric charge to the capacitor per switching event is limited to a lower limit value and the output voltage, or a feedback voltage commensurate therewith, is raised from a predetermined reference voltage; and a lower limit value setting circuit configured to variably control the lower limit value during the driven period of the switching output circuit. For example, the lower limit value setting circuit can increase the lower limit value with increase in the number of times of switching.

22 Claims, 17 Drawing Sheets

(56) References Cited

U.S. PATENT DOCUMENTS

| | | | |
|---|---|---|---|
| 2011/0169464 A1* | 7/2011 | Michishita | H02M 3/1563 |
| | | | 323/271 |
| 2014/0152242 A1* | 6/2014 | Bai | H02M 3/158 |
| | | | 320/107 |
| 2015/0188425 A1* | 7/2015 | Chang | H02M 3/158 |
| | | | 323/271 |
| 2015/0326102 A1* | 11/2015 | Radhakrishnan | H02M 1/00 |
| | | | 323/271 |
| 2019/0319536 A1* | 10/2019 | Hashiguchi | H02M 3/155 |

* cited by examiner

SWITCHING POWER SUPPLY OPERABLE IN AN INTERMITTENT DRIVING MODE

CROSS-REFERENCE TO RELATED APPLICATIONS

This application is based on the following Japanese Patent Applications, the contents of which are hereby incorporated by reference:
(1) Japanese Patent Application published as No. 2018-164148 (filed on Sep. 3, 2018)
(2) Japanese Patent Application published as No. 2018-179904 (filed on Sep. 26, 2018)
(3) Japanese Patent Application published as No. 2018-230997 (filed on Dec. 10, 2018)

BACKGROUND OF THE INVENTION

1. Field of the Invention

The invention disclosed herein relates to switching power supplies.

2. Description of Related Art

Conventionally, there are used, as means for supplying electric power in a variety of applications, switching power supplies (what is called DC-DC converters) that generate a desired output voltage from an input voltage.

Examples of the just-mentioned conventional technology are seen in Japanese Patent Applications published as Nos. 2017-107551 and 2010-088218.

Conventional switching power supplies, however, leave room for further improvement in terms of efficiency.

Moreover, with conventional switching power supplies, a ripple component in the output voltage may cause an output capacitor to give off uncomfortable audible noise.

SUMMARY OF THE INVENTION

In view of the problems encountered by the present inventors, a first object of the invention disclosed herein is to provide a switching power supply with high efficiency.

In view of the problems encountered by the present inventors, a second object of the invention disclosed herein is to provide a switching power supply that is less likely to give off audible noise.

To achieve the first object above, according to one aspect of what is disclosed herein, a switching power supply includes: a switching output circuit configured to generate an output voltage from an input voltage by charging a capacitor by turning on and off an output transistor; a control circuit configured to halt the driving of the switching output circuit when charging electric charge to the capacitor per switching event is limited to a lower limit value and the output voltage, or a feedback voltage commensurate with it, is raised from a predetermined reference voltage; and a lower limit value setting circuit configured to variably control the lower limit value during the driven period of the switching output circuit.

To achieve the second object above, according to another aspect of what is disclosed herein, a switching power supply includes: a switching output circuit configured to generate an output voltage from an input voltage by charging a capacitor by turning on and off an output transistor; a lower limit value setting circuit configured to set a lower limit value of charging electric charge fed to the capacitor per switching event; and a control circuit configured to operate in an intermittent driving mode in which the control circuit repeats the driving and halting of the switching output circuit when the output voltage, or a feedback voltage commensurate with it, is raised from the reference voltage by the operation of the lower limit value setting circuit. Here, the control circuit is configured to control at least one of the driving halt timing and the driving restart timing of the switching output circuit, thereby to make the ripple frequency of the output voltage in the intermittent driving mode a frequency that does not cause the capacitor to give off audible noise.

Other features, elements, steps, benefits, and characteristics of the present invention will become clearer with reference to the following detailed description of preferred embodiments thereof in conjunction with the accompanying drawings.

DETAILED DESCRIPTION OF PREFERRED EMBODIMENTS

Switching Power Supply (Basic Configuration)

Figure 1:
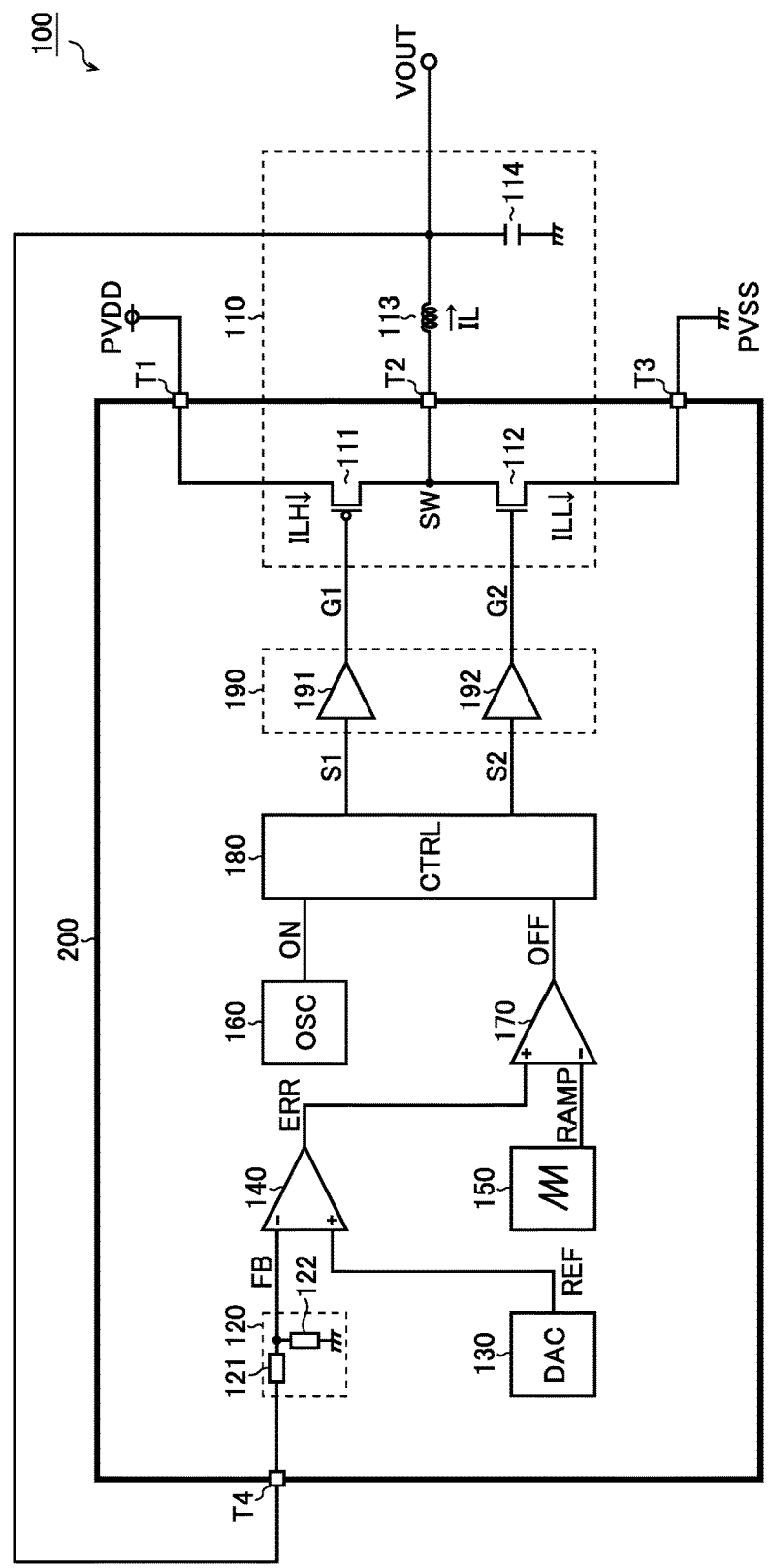
FIG. 1 a diagram showing a basic configuration of a switching power supply.

FIG. 1 is a diagram showing a basic configuration of a switching power supply. The switching power supply 100 of this configuration example is a DC-DC converter employing PWM (pulse-width modulation) driving which generates an output voltage VOUT from an input voltage PVDD to supply the output voltage VOUT to an unillustrated load. The switching power supply 100 includes a switching output circuit 110, a feedback voltage generation circuit 120, a reference voltage generation circuit 130, an error amplifier 140, a ramp signal generation circuit 150, an oscillator 160, a PWM comparator 170, a control circuit 180, and a switching drive circuit 190.

Except some components (in FIG. 1, an inductor 113 and a capacitor 114) included in the switching output circuit 110, the components enumerated above can be integrated in a semiconductor integrated circuit device 200 (what is called a power control IC) that acts as the principal controlling agent in the switching power supply 100. The semiconductor integrated circuit device 200 can further incorporate, as necessary, any components (such as various protection circuits) other than those mentioned above.

The semiconductor integrated circuit device 200 also includes, as means for establishing electrical connections with outside the device, a plurality of external terminals (in FIG. 1, four of them are shown by way of example, which are a power terminal T1, an output terminal T2, a ground terminal T3, and a feedback terminal T4).

The switching output circuit 110 is a step-down switching output stage that, by turning on and off high-side and low-side switches connected so as to form a half bridge, drives an inductor current IL and that thereby generates the output voltage VOUT from the input voltage PVDD. The switching power supply 100 includes an output transistor 111, a synchronous rectification transistor 112, an inductor 113, and a capacitor 114 (corresponding to an output capacitor).

The output transistor 111 is a PMOSFET (P-channel metal-oxide-semiconductor field-effect transistor) that functions as the high-side switch in the switching output stage. Within the semiconductor integrated circuit device 200, the source of the output transistor 111 is connected to the power terminal T1 (that is, a terminal to which the input voltage PVDD is applied). The drain of the output transistor 111 is connected to the output terminal T2 (that is, a terminal to which a switching voltage SW is applied). The gate of the output transistor 111 is connected to a terminal to which a high-side gate signal G1 is applied. The output transistor 111 is off when the high-side gate signal G1 is at high level, and is on when the high-side gate signal G1 is at low level.

The synchronous rectification transistor 112 is an NMOSFET (N-channel MOSFET) that functions as the low-side switch in the switching output stage. Within the semiconductor integrated circuit device 200, the source of the synchronous rectification transistor 112 is connected to the ground terminal T3 (that is, a terminal to which a ground voltage PVSS is applied). The drain of the synchronous rectification transistor 112 is connected to the output terminal T2. The gate of the synchronous rectification transistor 112 is connected to a terminal to which a low-side gate signal G2 is applied. The synchronous rectification transistor 112 is on when the low-side gate signal G2 is at high level, and is off when the low-side gate signal G2 is at low level.

The inductor 113 and the capacitor 114 are discrete components that are connected externally to the semiconductor integrated circuit device 200, and constitute an LC filter that generates the output voltage VOUT by rectifying and smoothing the switching voltage SW. Outside the semiconductor integrated circuit device 200, the first terminal of the inductor 113 is connected to the output terminal T2 of the semiconductor integrated circuit device 200. The second terminal of the inductor 113 and the first terminal of the capacitor 114 are both connected to a terminal to which the output voltage VOUT is applied, and also to the feedback terminal T4. The second terminal of the capacitor 114 is connected to a grounded terminal.

The output transistor 111 and the synchronous rectification transistor 112 are turned on and off complimentarily according to the high-side and low-side gate signals G1 and G2. As a result of such on/off operation, at the first terminal of the inductor 113 appears a switching voltage SW with a rectangular waveform that is pulse-driven between the input voltage PVDD and the ground voltage PVSS. Here, the term "complementarily" covers not only operation where the on/off states of the output transistor 111 and the synchronous rectification transistor 112 are completely reversed but also operation where there is secured a period (dead time) during which both transistors are off simultaneously.

The switching output circuit 110 may be of any output type other than a step-down type as mentioned above; it may instead be of a step-up type, step-up/down, or inverting type. Likewise, the switching output circuit 110 may be of any rectification type other than a synchronous rectification type as mentioned above; it may instead be of a diode rectification type where a rectifying diode is used as the low-side switch.

The output transistor 111 may be replaced with an NMOSFET. In that case, however, the high level of the high-side gate signal G1 needs to be raised to a voltage value higher than the input voltage PVDD, and this will require a bootstrap circuit, a charge-pump circuit, or the like.

The output transistor 111 and the synchronous rectification transistor 112 may be connected externally to the semiconductor integrated circuit device 200. In that case, the high-side and low-side gate signals G1 and G2 need to be output externally, and this will require, instead of the output terminal T2, external terminals respectively.

In particular, in applications where a high voltage is applied to the switching output circuit 110, as the output transistor 111 and the synchronous rectification transistor 112, it is possible to use high-withstand-voltage devices such as power MOSFETs, IGBTs (insulated-gate bipolar transistors), or Sic transistors.

The feedback voltage generation circuit 120 includes resistors 121 and 122 that are connected in series between the feedback terminal T4 (that is, the terminal to which the output voltage VOUT is applied) and the grounded terminal. The feedback voltage generation circuit 120 outputs, from the connection node between the two resistors, a feedback voltage FB (which is a division voltage of the output voltage VOUT) commensurate with the output voltage VOUT.

In a case where the output voltage VOUT falls within the input dynamic range of the error amplifier 140, the feedback voltage generation circuit 120 may be omitted, in which case the output voltage VOUT can be input directly to the error amplifier 140.

The resistors 121 and 122 may be connected externally to the semiconductor integrated circuit device 200, in which case the connection node between the resistors 121 and 122 can be connected to the feedback terminal T4.

The reference voltage generation circuit 130 generates a predetermined reference voltage REF (corresponding to a target set value for the output voltage VOUT). As the reference voltage generation circuit 130, it is possible to use a DAC (digital-to-analog converter) that converts a digital reference voltage setting signal to an analog reference voltage REF. With this configuration, the reference voltage setting signal can be utilized to realize soft-start operation at start-up, or to adjust the output voltage VOUT.

The error amplifier 140 generates an error signal ERR commensurate with the difference between the feedback voltage FB, which is fed to the inverting input terminal (−) of the error amplifier 140, and the reference voltage REF, which is fed to the non-inverting input terminal (+) of the error amplifier 140. The error signal ERR increases when the feedback voltage FB is lower than the reference voltage REF, and decreases when the feedback voltage FB is higher than the reference voltage REF.

The ramp signal generation circuit 150 generates a ramp signal RAMP with a triangular, saw-tooth, or nth-slope waveform (for example, n=2) that increases during the on-period of the output transistor 111. The ramp signal RAMP starts to increase from a zero value at the on-timing of the output transistor 111, and is reset to a zero value at the off-timing of the output transistor 111.

The oscillator 160 generates an on-signal ON (which is a clock signal) that is pulse-driven at a predetermined switching frequency fsw (=1/Tsw).

The PWM comparator 170 generates an off-signal OFF by comparing the error signal ERR, which is fed to the non-inverting input terminal (+) of the PWM comparator 170, with the ramp signal RAMP, which is fed to the inverting input terminal (−) of the PWM comparator 170. The off-signal OFF is at high level when the ramp signal RAMP is lower than the error signal ERR, and is at low level when the ramp signal RAMP is higher than the error signal ERR. Thus, the timing of pulse generation in the off-signal OFF is later the higher the error signal ERR, and is earlier the lower the error signal ERR.

The control circuit 180 generates a high-side control signal S1 and a low-side control signal S2 according to the on-signal ON and the off-signal OFF. Specifically, when a pulse is generated in the on-signal ON, the control circuit 180 drops the high-side and low-side control signals S1 and S2 both to low level (the logic level to turn the switching voltage SW to high level); on the other hand, when a pulse is generated in the off-signal OFF, the control circuit 180 raises the high-side and low-side control signals S1 and S2 both to high level (the logic level to turn the switching voltage SW to low level).

Accordingly, the on-period Ton of the output transistor 111 (that is, the high-level period of the switching voltage SW) is longer the later the timing of pulse generation in the off-signal OFF and, reversely, it is shorter the earlier the timing of pulse generation in the off-signal OFF. That is, the on-duty D (=Ton/Tsw) of the output transistor 111 is higher the higher the error signal ERR, and is lower the lower the error signal ERR.

The switching drive circuit 190 includes a high-side driver 191, which is fed with the high-side control signal S1 to generate the high-side gate signal G1, and a low-side driver 192, which is fed with the low-side control signal S2 to generate the low-side gate signal G2. As the high-side and low-side drivers 191 and 192, it is possible to use buffers and inverters respectively.

Of the components described above, the error amplifier 140, the ramp signal generation circuit 150, the oscillator 160, the PWM comparator 170, the control circuit 180, and the switching drive circuit 190 can be understood as an output feedback controller that controls the duty of the switching output circuit 110 such that the feedback voltage FB remains equal to the predetermined reference voltage REF.

Switching Power Supply (Configuration of a Principal Part)

Figure 2:
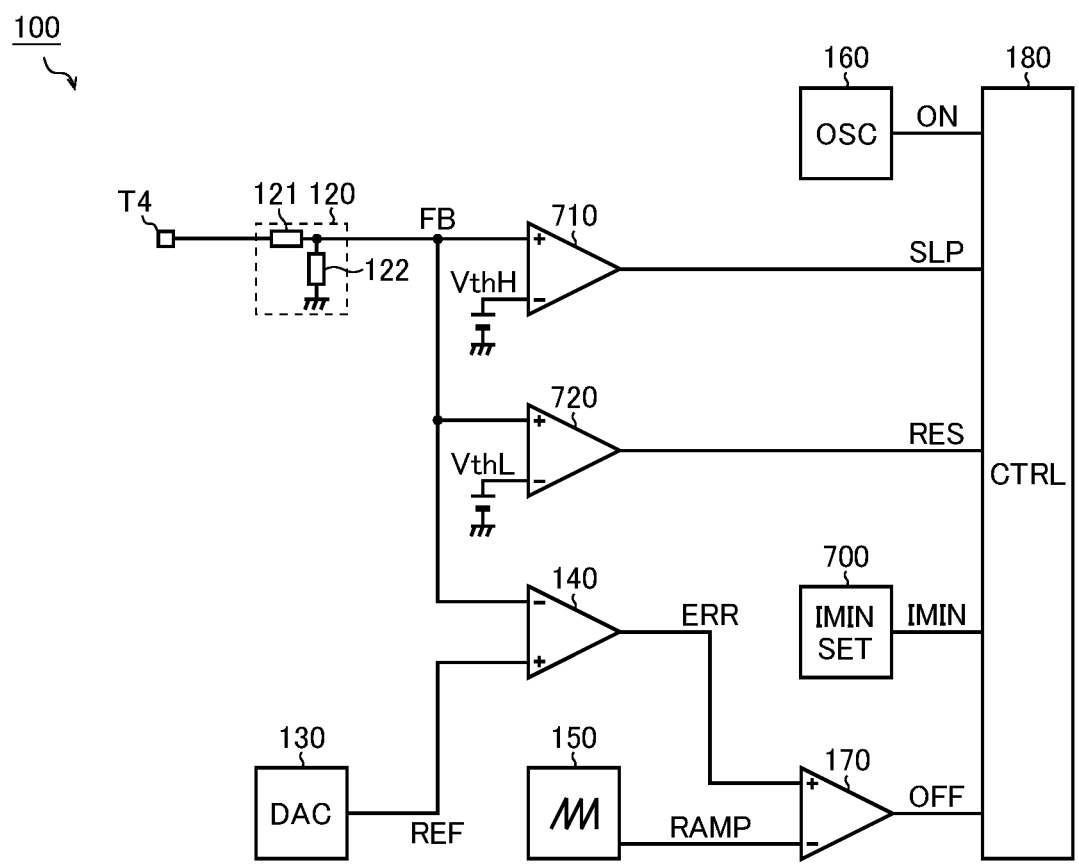
FIG. 2 is a diagram showing a configuration of a principal part of a switching power supply.

FIG. 2 is a diagram showing a configuration of a principal part of the switching power supply 100. The switching power supply 100 of this configuration example further includes, that is, includes in addition to the previously described components (of which shown expressly in FIG. 2 are the reference voltage generation circuit 130, the error amplifier 140, the ramp signal generation circuit 150, the oscillator 160, the PWM comparator 170, and the control circuit 180), a lower limit value setting circuit 700 and comparators 710 and 720 as means for realizing an intermittent driving mode (which will be described in detail later) under a light load. The following description focuses on these additional components.

The lower limit value setting circuit 700 compares a sensed value ISNS of the inductor current IL passing in the switching output circuit 110 with a predetermined reference current value IREF to generate a lower limit value setting signal IMIN for setting the lower limit value of the charging electric charge that is fed to the capacitor 114 per switching event in the switching output circuit 110. More specifically, in the lower limit value setting signal IMIN, a pulse is generated at the timing that ISNS=IREF. In a case where the ratio of the input voltage PVDD to the output voltage VOUT is constant, the lower limit value of the just-mentioned charging electric charge can be understood as the minimum on-period Tmin (or the minimum on-duty Dmin) of the switching output circuit 110.

The lower limit value setting circuit 700 also has a function of variably controlling the lower limit value of the charging electric charge per switching event during the driven period of the switching output circuit 110 in the intermittent driving mode. The lower limit value varying function will be described in detail later.

The comparator 710 generates a sleep signal SLP (corresponding to a first comparison signal) by comparing the feedback voltage FB, which is fed to the non-inverting input terminal (+) of the comparator 710, with a high-side threshold value VthH (for example, VthH=1.03×REF), which is fed to the inverting input terminal (−) of the comparator 710. The sleep signal SLP is at high level when the feedback voltage FB is higher than the high-side threshold value VthH, and is at low level when the feedback voltage FB is lower than the high-side threshold value VthH.

The comparator 720 generates a resume signal RES (corresponding to a second comparison signal) by comparing the feedback voltage FB, which is fed to the non-inverting input terminal (+) of the comparator 720, with a low-side threshold value VthL (for example, VthL=1.01× REF), which is fed to the inverting input terminal (−) of the comparator 720. The resume signal RES is at high level when the feedback voltage FB is higher than the low-side threshold value VthL, and is at low level when the feedback voltage FB is lower than the low-side threshold value VthL.

The control circuit 180 turns the high-side and low-side control signal S1 and S2 both to low level at the timing of pulse generation in the on-signal ON, and thereby turns the output transistor 111 on and the synchronous rectification transistor 112 off. At this point, the switching voltage SW turns to high level PVDD).

On the other hand, the control circuit 180 turns the high-side and low-side control signal S1 and S2 both to high level at whichever is earlier of the timing of pulse generation in the off-signal OFF and the timing of pulse generation in the lower limit value setting signal IMIN, and thereby turns the output transistor 111 off and the synchronous rectification transistor 112 on. At this point, the switching voltage SW turns to low level PVSS). That is, if the timing of pulse generation in the lower limit value setting signal IMIN is later than the timing of pulse generation in the off-signal OFF, the off-timing of the output transistor 111 is determined by the lower limit value setting signal IMIN. This state corresponds to a state where the charging electric charge to the capacitor 114 per switching event is limited to the lower limit value.

When, as a result of the charging electric charge to the capacitor 114 per switching event being limited to the lower limit value, the feedback voltage FB rises from the reference voltage REF, the control circuit 180 enters the intermittent driving mode in which it repeats the driving and halting of the switching output circuit 110 such that the feedback voltage FB remains within a predetermined voltage range (VthL<FB<VthH).

Intermittent Driving Mode

Figure 3:
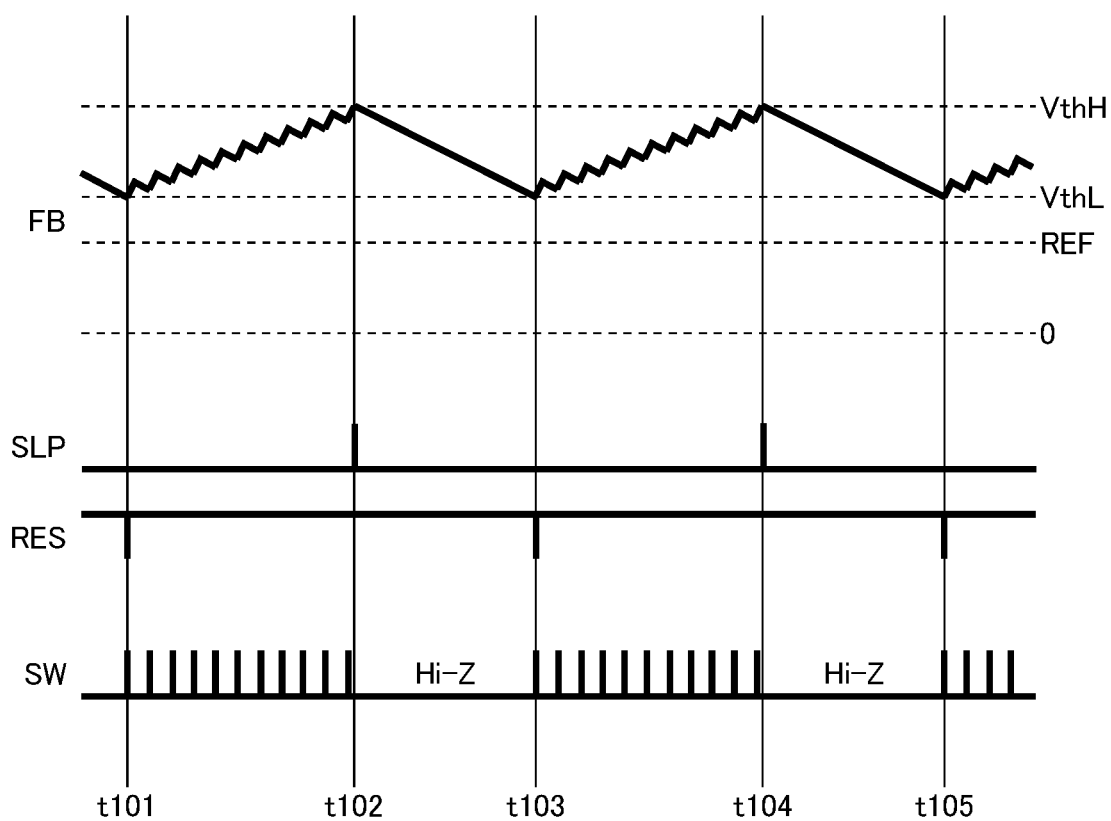
FIG. 3 is a diagram showing an example of basic operation in an intermittent driving mode.

FIG. 3 is a diagram showing an example of basic operation in the intermittent driving mode under a light load, depicting, from top down, the feedback voltage FB, the sleep signal SLP, the resume signal RES, and the switching voltage SW.

In a case where, by the operation of the lower limit value setting circuit 700 described previously, the charging electric charge to the capacitor 114 per switching event is limited to the predetermined lower limit value, when the load is light, the amount of charging electric charge to the capacitor 114 is larger than the amount of output electric charge (that is, discharged electric charge) from the capacitor 114. Accordingly, the output voltage VOUT rises, so that the feedback voltage FB becomes higher than the reference voltage REF. This rise in the output voltage VOUT is sensed by the control circuit 180, which then halts the driving of the switching output circuit 110.

In terms of what is shown in FIG. 3, the control circuit 180 halts the driving of the switching output circuit 110 at the timing that the feedback voltage FB becomes higher than the high-side threshold value VthH and the sleep signal SLP rises to high level (that is, at time points t102 and t104). Specifically, the control circuit 180 turns the output transistor 111 and the synchronous rectification transistor 112 both off, and brings the switching voltage SW into a high-impedance (Hi-Z) state.

Thereafter, the control circuit 180 restarts the driving of the switching output circuit 110 at the timing that the feedback voltage FB becomes lower than the low-side threshold value VthL and the resume signal RES falls to low level (that is, at time points t101, t103, and t105).

Implementing an intermittent driving mode as described above helps reduce the number of times that switching needs to be performed under a light load and thereby reduce switching loss. It is thus possible to improve the efficiency of the switching power supply 100.

Behavior with the Lower Limit Value Fixed

Figure 4:
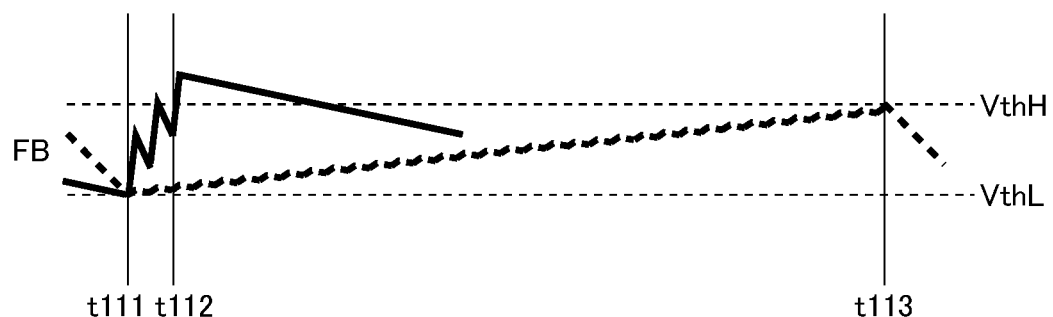
FIG. 4 is a diagram showing behavior observed with the lower limit value of charging electric charge per switching event limited.

FIG. 4 is a diagram showing behavior observed when the lower limit value of the charging electric charge per switching event is fixed, depicting the feedback voltage FB.

For example, in a case where the lower limit value of the charging electric charge per switching event is far larger than the electric charge consumed by the load (that is, in a case where the load is very light), the output voltage VOUT (and hence the feedback voltage FB) rises sharply every switching event. Thus, even if the driving of the switching output circuit 110 is halted immediately at the timing that the feedback voltage FB becomes higher than the high-side threshold value VthH (that is, at time point t112), before the output voltage VOUT actually stops rising, the output voltage VOUT has overshot to a voltage value higher than the target value, possibly invoking, in the worst case, overvoltage protection (see the solid line in FIG. 4).

On the other hand, in a case where the lower limit value of the charging electric charge per switching event is very close to the electric charge consumed by the load, the output voltage VOUT (and hence the feedback voltage FB) rises so slowly that switching needs to be performed a great many times before the driving of the switching output circuit 110 is halted.

To resolve the inconvenience, the lower limit value setting circuit 700 is provided with a function of variably controlling the lower limit value of the charging electric charge per switching event during the driven period of the switching output circuit 110 in the intermittent driving mode.

Behavior with the Lower Limit Value Variable

Figure 5:
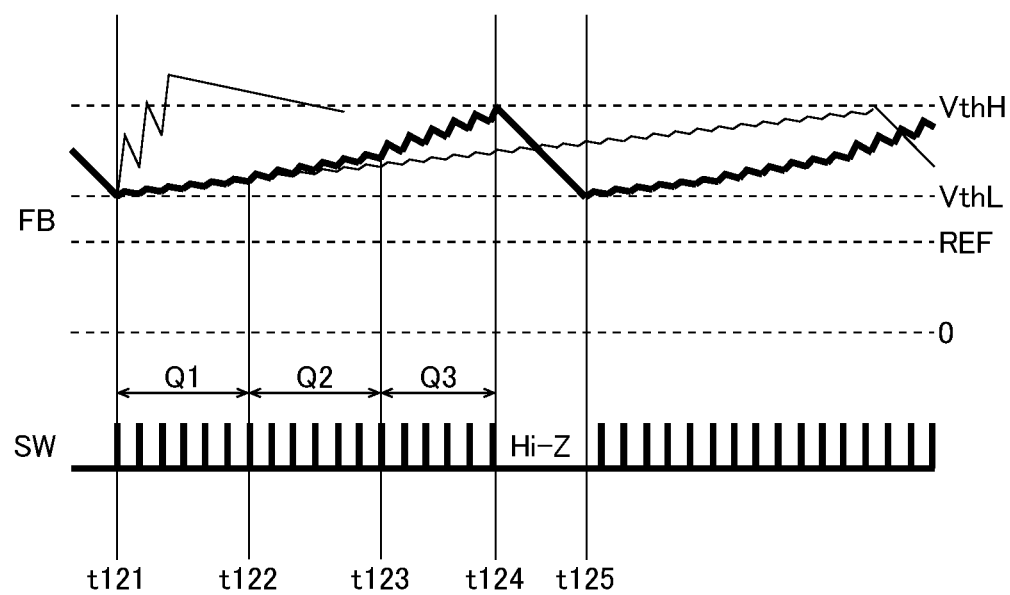
FIG. 5 is a diagram showing behavior observed with the lower limit value of charging electric charge per switching event variable.

FIG. 5 is a diagram showing behavior observed when the lower limit value of the charging electric charge per switching event is variable, depicting the feedback voltage FB. A thick line indicates behavior observed with the lower limit value variable, while a thin line indicates behavior observed with the lower limit value fixed (behavior similar to that shown in FIG. 4).

The lower limit value setting circuit 700 increases the lower limit value of the charging electric charge per switching event with the increase of the number of times of switching during the driven period (that is between time points t121 and t124) of the switching output circuit 110 in the intermittent driving mode.

Specifically, the lower limit value of the charging electric charge per switching event is set at Q1 between time points t121 and t122, at Q2 (>Q1) between time points t122 and t123, and at Q3 (>Q2) between time points t123 and t124.

Thus, during the driven period of the switching output circuit 110 (that is, between time points t121 and t124), the lower limit value of the charging electric charge is held low immediately after the start of switching, and is then increased as the number of times of switching increases.

Through variable control of the lower limit value as described above, when the load is light (that is, when switching is not supposed to be performed so many times until the feedback voltage FB reaches the high-side threshold value VthH), it is possible to suppress a rise in the output voltage VOUT (and hence the feedback voltage FB) at each switching event, and thereby to prevent overshooting.

On the other hand, when the load is heavy (that is, when switching is supposed to be performed a certain number of times until the feedback voltage FB reaches the high-side threshold value VthH), it is possible to raise the output voltage VOUT greatly at each switching event. It is thus possible to reduce the number of times that switching needs to be performed (and hence reduce switching loss), and thereby to enhance the efficiency of the switching power supply 100.

Lower Limit Value Setting Circuit

Figure 6:
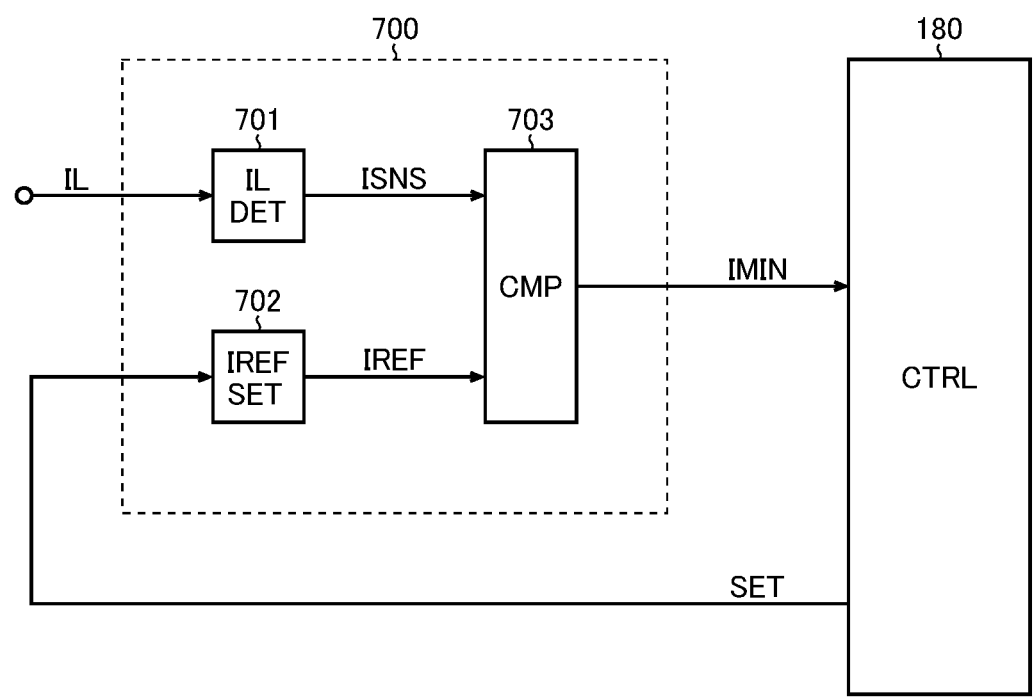
FIG. 6 is a diagram showing one configuration example of a lower limit value setting circuit.

FIG. 6 is a diagram showing one configuration example of the lower limit value setting circuit 700. The lower limit value setting circuit 700 of this configuration example includes an inductor current sensing block 701, a reference current setting block 702, and a comparing block 703.

The inductor current sensing block 701 generates a sense signal ISNS (corresponding to the sensed value of the inductor current IL) commensurate with the inductor current IL passing in the switching output circuit 110. Here, the inductor current IL can be sensed by any of different methods including one involving sensing the drain-source voltage of the output transistor 111 or the synchronous rectification transistor 112, one involving the drain-source voltage of a current-sensing transistor that is connected in parallel with the output transistor 111 or the synchronous rectification transistor 112, and one involving sensing the voltage across a sense resistor provided in the path across which the inductor current IL passes.

The reference current setting block 702 sets the reference current value IREF (corresponding to a current clamp value) according to a reference current setting signal SET fed to it from the control circuit 180.

The comparing block 703 compares the sense signal ISNS with the reference current value IREF to generate the lower limit value setting signal IMIN.

Figure 7:
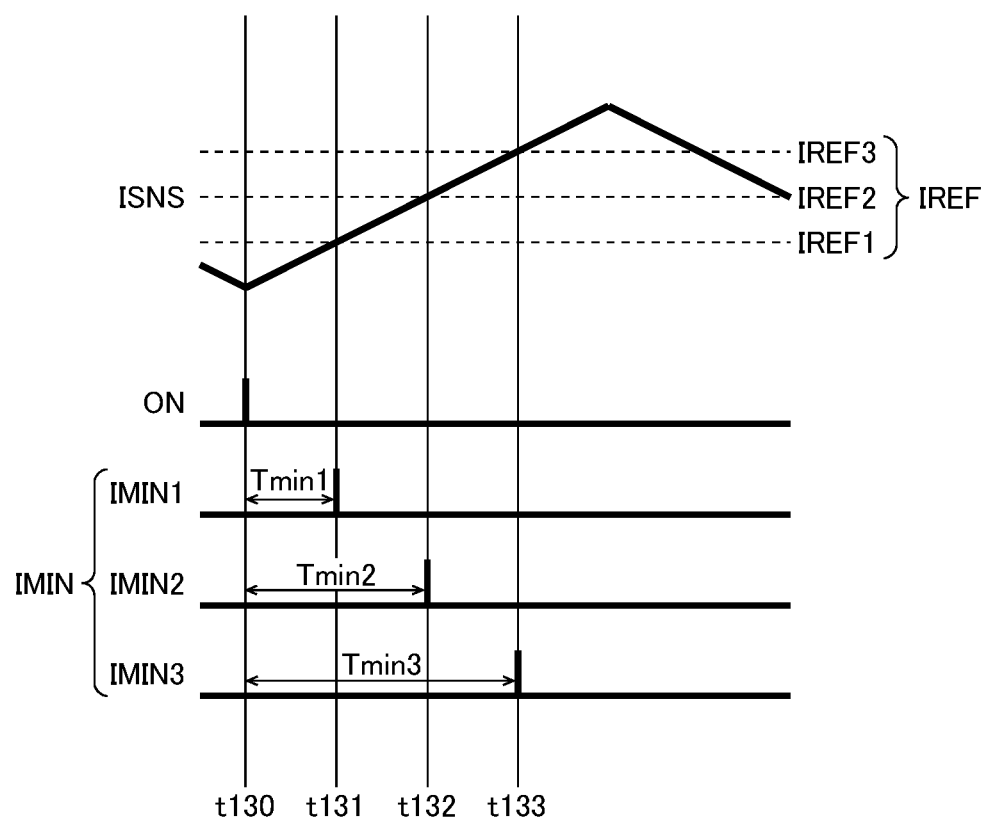
FIG. 7 is a diagram showing one example of operation of a lower limit value setting circuit.

FIG. 7 is a diagram showing one example of the operation of the lower limit value setting circuit 700, depicting, from top down, the sense signal ISNS, the on-signal ON, and the lower limit value setting signal IMIN. It is here assumed that the reference current value IREF, with which the sense signal ISNS is compared, is set at one of set values IREF1 to IREF3 (where IREF1<IREF2<IREF3).

When, at time point t130, a pulse is generated in the on-signal ON, the inductor current IL starts to increase, and thus the signal value of the sense signal ISNS increases.

First, consider a case where the reference current value IREF is set at the set value IREF1. In this case, at time point t131 when ISNS=IREF1, a pulse is generated in the lower limit value setting signal IMIN (see IMIN1 in the diagram). Thus, the minimum on-period Tmin1 of the output transistor 111 is between time points t130 and t131.

Next, consider a case where the reference current value IREF is set at the set value IREF2. In this case, at time point t132 when ISNS=IREF2, a pulse is generated in the lower limit value setting signal IMIN (see IMIN2 in the diagram). Thus, the minimum on-period Tmin2 of the output transistor 111 is between time points t130 and t132.

Further, consider a case where the reference current value IREF is set at the set value IREF3. In this case, at time point t133 when ISNS=IREF1, a pulse is generated in the lower limit value setting signal IMIN (see IMIN3 in the diagram). Thus, the minimum on-period Tmin3 of the output transistor 111 is between time points t130 and t133.

In this way, in the lower limit value setting circuit 700, by varying the reference current value IREF according to the reference current setting signal SET, it is possible to variably control the timing of pulse generation in the lower limit value setting signal IMIN (and hence the minimum on-period Tmin of the output transistor 111).

FIG. 5 referred to previously illustrates operation in which the lower limit value of the charging electric charge per switching event is increased according to the number of times that switching is performed. Such operation can be realized, for example, by generating the reference current setting signal SET according to the number of times of switching such that the reference current value IREF is switched from IREF1 to IREF2 to IREF3.

Variable control of the lower limit value may be realized by any method other than the one described above; for example, the lower limit value of the charging electric charge per switching event may be variably controlled according to the heaviness of the load rather than the number of times of switching.

Specifically, the reference current setting signal SET can be generated such that the lower limit value of the charging electric charge per switching event is increased with increase of the load.

For example, in a recent trend, more and more power ICs for use on vehicles have come to be equipped with a function of first converting the sensed value (analog value) of the inductor current into a digital signal and then monitoring it with a logic circuit. With such power ICs, it is possible to realize variable control of the lower limit value according to the heaviness of the load with no need for an extra component.

Limiting the Ripple Frequency (1st Practical Example)

Figure 8:
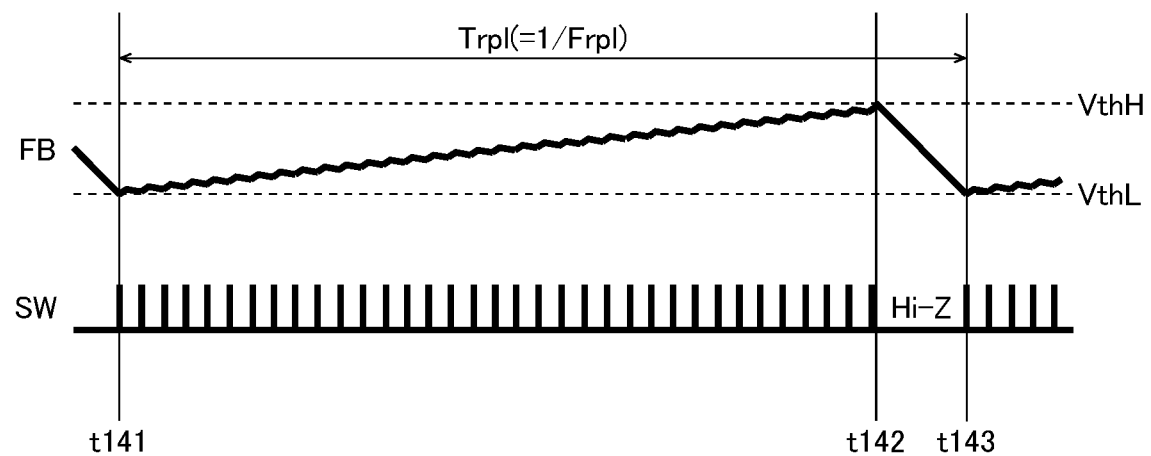
FIG. 8 is a diagram showing behavior in an intermittent driving mode, in a medium-load region.

FIG. 8 is a diagram showing behavior observed in the intermittent driving mode, in a medium-load region, depicting, from top down, the feedback voltage FB and the switching voltage SW.

In a load region (called the "medium-load region" in the present specification) in which the lower limit value of the charging electric charge per switching event is very close to the electric charge consumed by the load, as shown in FIG. 8, the output voltage VOUT (and hence the feedback voltage FB) rises very slowly during the driven period (between time points t141 and t142) of the switching output circuit 110.

Accordingly, in the medium-load region, the ripple period Trp1 (that is, between time points t141 and t143) of the output voltage VOUT (and hence the feedback voltage FB) is longer, and thus its reciprocal, that is, the ripple frequency Frp1, is lower.

If, in particular, the ripple frequency Frp1 falls in the human audible range (generally from about 20 Hz to 20 kHz), the capacitor 114 may give off uncomfortable noise.

To resolve the inconvenience, the control circuit 180 is equipped with a function (ripple frequency limiting function) of controlling at least one of the driving halt timing and the driving restart timing of the switching output circuit 110 and thereby making the ripple frequency Frp1 of the output voltage VOUT (and hence the feedback voltage FB) in the intermittent driving a frequency that does not cause the capacitor 114 to give off audible noise.

Figure 9:
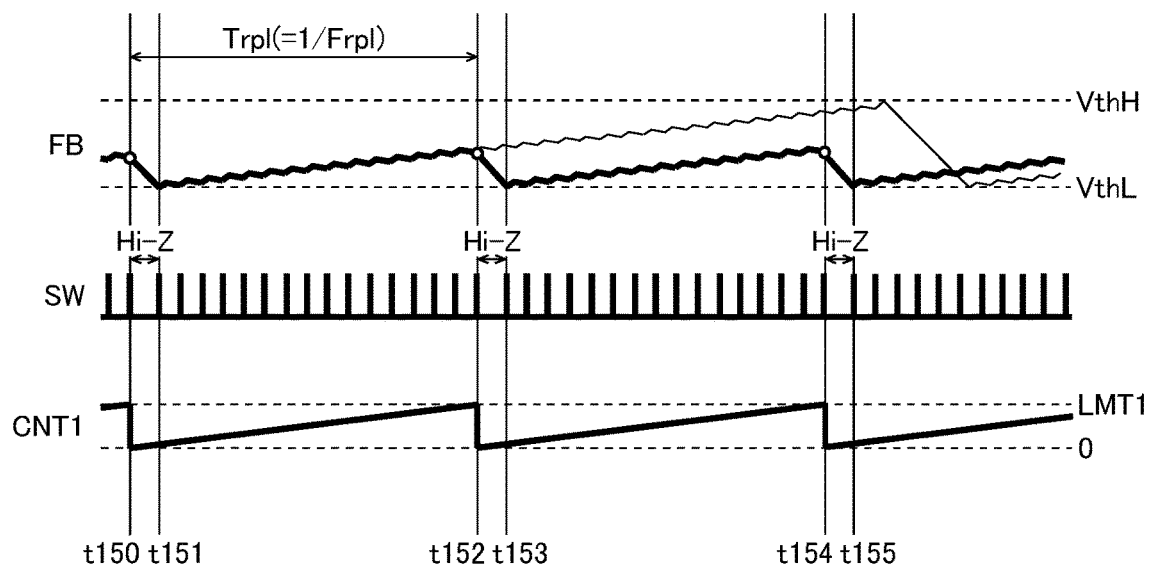
FIG. 9 is a diagram showing a first practical example of ripple frequency limiting.

FIG. 9 is a diagram showing a first practical example of ripple frequency limiting, depicting, from top down, the feedback voltage FB, the switching voltage SW, and a count value CNT1. A thick line indicates behavior observed with the ripple frequency Frp1 limited, while a thin line indicates behavior observed with the ripple frequency Frp1 not limited (behavior similar to that shown in FIG. 8).

The control circuit 180 includes a first counter that counts the lapse of time (which is the count value CNT1) starting at every driving halt timing (see hollow circles at time points t150, t152, and t154) of the switching output circuit 110 in the intermittent driving mode.

During the driving of the switching output circuit 110, when a predetermined upper-limit time (corresponding to the upper-limit time of the ripple period Trp1) has elapsed since the previous driving halt timing, the control circuit 180 forcibly halts the driving of the switching output circuit 110 even if the feedback voltage FB is not higher than the high-side threshold value VthH.

Specifically, in terms of what is shown in FIG. 9, for example, when, at time point t150, the driving of the switching output circuit 110 is halted, the feedback voltage FB, which has thus far been increasing, starts to decrease. Thereafter, when, at time point t151, the feedback voltage FB becomes lower than the low-side threshold value VthL, the driving of the switching output circuit 110 is restarted, and the feedback voltage FB starts back to increase.

On the other hand, the count value CNT1 is reset to a zero value at the time point that the driving of the switching output circuit 110 is halted, that is, at time point t150, and then goes incremented at a predetermined period.

When, during the driving of the switching output circuit 110 (that is, at time point 152), the count value CNT1 reaches an upper-limit value LMT1, the driving of the switching output circuit 110 is forcibly halted even if the feedback voltage FB is not higher than the high-side threshold value VthH.

In this way, it is possible to shorten the ripple period Trp1 (that is, between time points t150 and t152) of the output voltage VOUT (and hence the feedback voltage FB), and thus to suppress a drop in its reciprocal, that is, the ripple frequency Frp1. After time point t152, operation similar to that described above is repeated.

Figure 10:
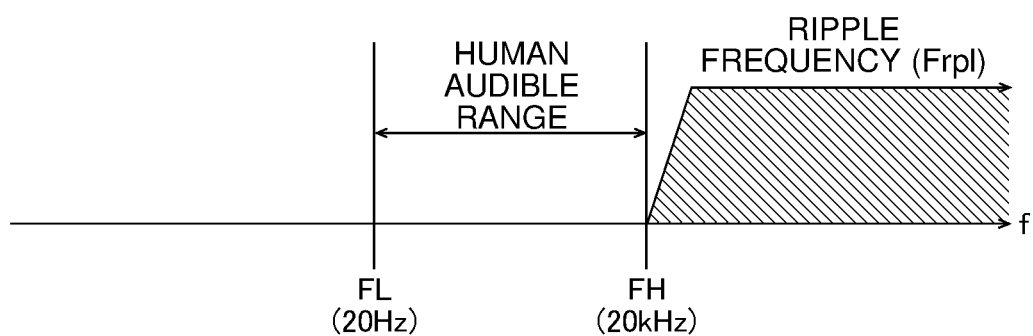
FIG. 10 is a diagram showing a relationship between human audible range and ripple frequency in the first practical example.

FIG. 10 is a diagram showing a relationship between the human audible range (between the audible upper- and lower-limit frequencies FH and FL) and the ripple frequency Frp1 in the first practical example.

Setting the upper-limit value LMT1 of the count value CNT1 mentioned above such that the ripple period Trp1 is shorter than the reciprocal (generally about 50 μs) of the human audible upper-limit frequency FH permits the ripple frequency Frp1 to remain higher than the audible upper-limit frequency FH (generally about 20 kHz) (see the hatched region in FIG. 10). It is thus possible to reduce or eliminate uncomfortable noise given off from the capacitor 114.

In FIG. 10, to simplify description, the ripple frequency Frp1 is contrasted with the human audible range such that Frp1>FH. Even if the ripple frequency Frp1 is slightly lower than the human audible upper-limit frequency FH, so long as the capacitor 114 does not give off audible noise (or gives off less of such noise), ripple frequency limiting can be said to be functioning effectively. That is, the ripple frequency Frp1 need only be limited to such a frequency that the capacitor 114 does not give off audible noise.

Figure 11:
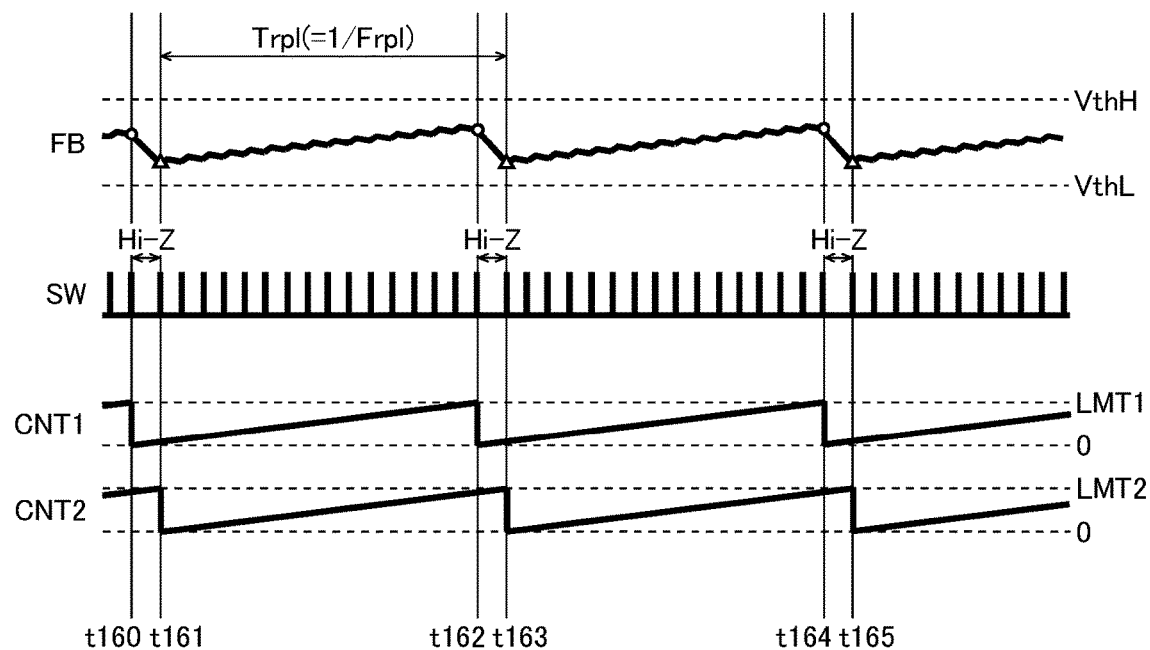
FIG. 11 is a diagram showing one modified example of the first practical example.

FIG. 11 is a diagram showing a modified example of the first practical example, depicting, from top down, the feedback voltage FB, the switching voltage SW, and count values CNT1 and CNT2.

The control circuit 180 of this modified example further includes, that is, includes in addition to the first counter described previously, a second counter that counts the lapse of time (which is the count value CNT2) starting at every driving restart timing (see hollow triangles at time points t161, t163, and t165) in the intermittent driving mode.

During the halt of the switching output circuit 110, when a predetermined upper-limit time has elapsed since the previous driving restart timing, the control circuit 180 restarts the driving of the switching output circuit 110 even if the feedback voltage FB is not lower than the low-side threshold value VthL.

In terms of what is shown in FIG. 11, for example, when, at time point t161, the driving of the switching output circuit 110 is restarted, the feedback voltage FB, which has thus far been decreasing, starts to increase. Thereafter, when, at time point t162, the driving of the switching output circuit 110 is halted, the feedback voltage FB starts back to decrease.

On the other hand, the count value CNT2 is reset to a zero value at the time point that the driving of the switching output circuit 110 is restarted, that is, at time point t161, and then goes incremented at a predetermined period.

When, during the halt of the switching output circuit 110 (that is, at time point t163), the count value CNT2 reaches an upper-limit value LMT2, the driving of the switching output circuit 110 is forcibly restarted even if the feedback voltage FB is not lower than the low-side threshold value VthL.

In this way, it is possible to shorten the ripple period Trp1 (that is, between time points t161 and t163) of the output voltage VOUT (and hence the feedback voltage FB), and thus to suppress a drop in its reciprocal, that is, the ripple frequency Frp1. After time point t163, operation similar to that described above is repeated Limiting the Ripple Frequency (2nd Practical Example)

Figure 12:
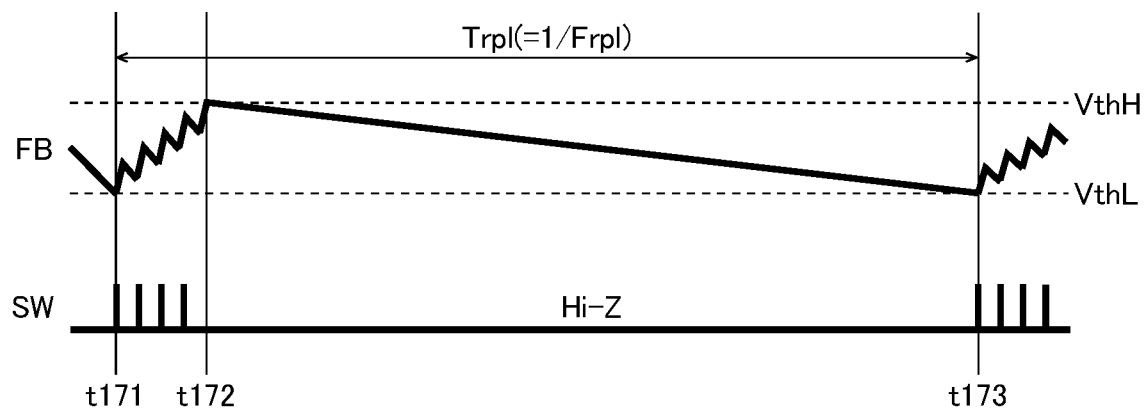
FIG. 12 is a diagram showing behavior in an intermittent driving mode, in a ultralight-load region.

FIG. 12 is a diagram showing behavior observed in the intermittent driving mode, in an ultralight-load region, depicting, from top down, the feedback voltage FB and the switching voltage SW.

In a load region (called the "ultralight-load region" in the present specification) in which the lower limit value of the charging electric charge per switching event is far larger than the electric charge consumed by the load, as shown in FIG. 12, the output voltage VOUT (and hence the feedback voltage FB) falls very slowly during the non-driven period (that is, between time points t172 and t173) of the switching output circuit 110.

Accordingly, in the ultralight-load region, the ripple period Trp1 (that is, between time points t171 and t173) of the output voltage VOUT (and hence the feedback voltage FB) is longer, and thus its reciprocal, that is, the ripple frequency Frp1, is lower.

If, in particular, the ripple frequency Frp1 falls in the human audible range (generally from about 20 Hz to 20 kHz), the capacitor 114 may give off uncomfortable noise.

To resolve the inconvenience, the control circuit 180 is equipped with a function (ripple frequency limiting function) of controlling the driving restart timing of the switching output circuit 110 so that the ripple frequency Frp1 of the output voltage VOUT (and hence the feedback voltage FB) in the intermittent driving mode is such as not to cause the capacitor 114 to give off audible noise.

Figure 13:
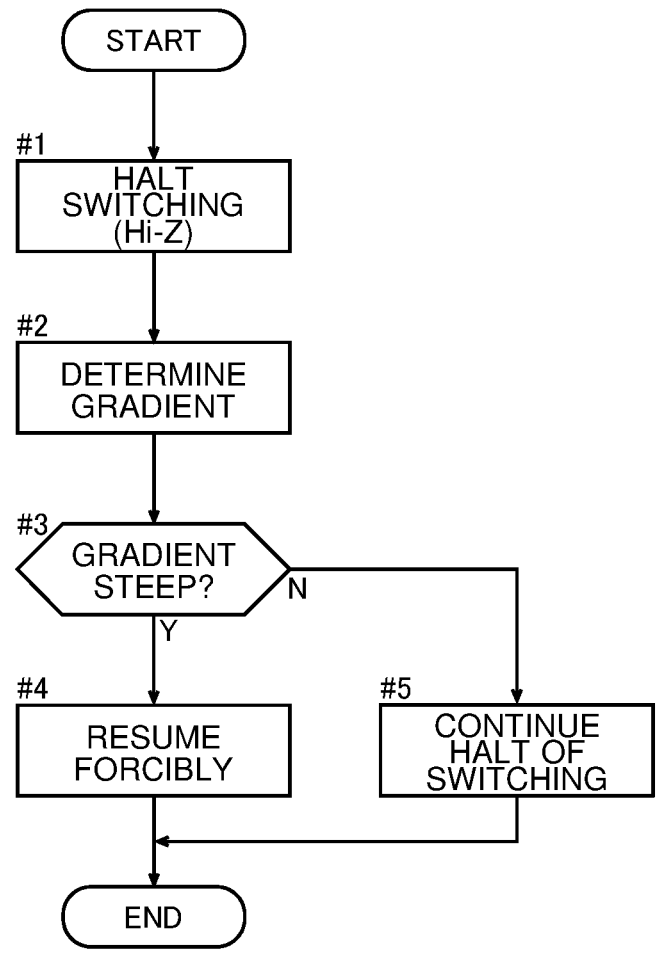
FIG. 13 is a flow chart showing a second practical example of ripple frequency limiting.

FIG. 13 is a flow chart showing a second practical example of ripple frequency limiting. When, at step #1, the driving of the switching output circuit 110 is halted, then subsequently, at step #2, gradient determination (which will be described in detail later) is performed on the feedback voltage FB.

Then, if, at step #3, it is determined that the gradient of the feedback voltage FB is steeper (that is, its absolute value is greater) than a predetermined value, an advance is made to step #4, where the driving of the switching output circuit 110 is forcibly restarted (forcible resuming).

On the other hand, if, at step S #3, it is determined that the gradient of the feedback voltage FB is not steeper (that is, its absolute value is equal to or smaller) than the predetermined value, an advance is made to step #5, where the driving of the switching output circuit 110 continues to be halted.

In this way, after the driving of the switching output circuit 110 is halted, the control circuit 180 performs gradient determination on the feedback voltage FB (and hence the output voltage VOUT), and according to the result of determination, decides whether or not to continue to halt the driving of the switching output circuit 110.

The threshold value for the gradient determination at step #3 can be set at such a value that allows determination of whether, when the driving of the switching output circuit 110 continues to be halted, the ripple frequency Frp1 becomes lower than the human audible lower-limit frequency FL (generally about 20 Hz), or the ripple frequency Frp1 becomes higher than the human audible lower-limit frequency FL, and so falls in the human audible range.

The driving restart timing at step #4 does not necessarily have to immediately follow step #3 resulting in "Yes"; the driving of the switching output circuit 110 can be restarted with appropriate timing such that the ripple frequency Frp1 is higher than the human audible upper-limit frequency FH (generally about 20 kHz).

When driving continues being halted at step #5, a shift can be made into a power saving mode in which the supply of electric power is cut off except to some circuits (such as the comparator 720, which is for resuming, and the control circuit 180) that are needed to restart the driving of the switching output circuit 110. Such mode switching helps achieve enhanced efficiency in the ultralight-load region.

Figure 14:
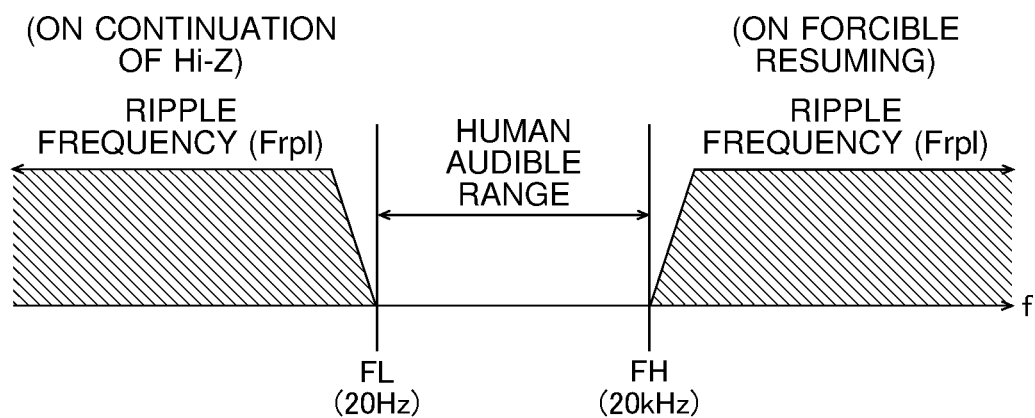
FIG. 14 is a diagram showing a relationship between human audible range and ripple frequency in the second practical example.

FIG. 14 is a diagram showing a relationship between the human audible range (between the audible upper- and lower-limit frequencies FH and FL) and the ripple frequency Frp1 in the second practical example.

On forcible resuming of operation in the switching output circuit 110 (that is, when, at step #3 in FIG. 13, the gradient of the feedback voltage FB is determined to be steep and then, at step #4, the driving of the switching output circuit 110 is forcibly restarted), the ripple frequency Frp1 is kept at a value higher than the human audible upper-limit frequency FH (generally about 20 kHz).

On the other hand, on continuation of the Hi-Z state in the switching output circuit 110 (that is, when, at step #3 in FIG. 13, the gradient of the feedback voltage FB is determined to be not steep and then, at step #4, the driving of the switching output circuit 110 continues to be halted), the ripple frequency Frp1 is kept at a value lower than the human audible lower-limit frequency FL (generally about 20 Hz).

As described above, with the ripple frequency limiting of the second practical example, the ripple frequency Frp1 is kept out of the human audible range, and it is thus possible to prevent or reduce uncomfortable noise given off by the capacitor 114.

In FIG. 14, to simplify description, the ripple frequency Frp1 is contrasted with the human audible range such that Frp1<FL (or Frp1>FH). Even if the ripple frequency Frp1 is slightly higher than the human audible upper-limit frequency FL, so long as the capacitor 114 does not give off audible noise (or gives off less of such noise), ripple frequency limiting can be said to be functioning effectively. That is, the ripple frequency Frp1 need only be limited to such a frequency that the capacitor 114 does not give off audible noise.

For example, the upper-limit value of the ripple frequency Frp1 during the continuation of the Hi-Z state in the ultra-light-load region does not necessarily have to be lower than the human audible lower-limit frequency FL (for example, about 20 Hz), and can be a realistic value that does not cause the capacitor 114 to give off audible noise.

Gradient Determination

Figure 15:
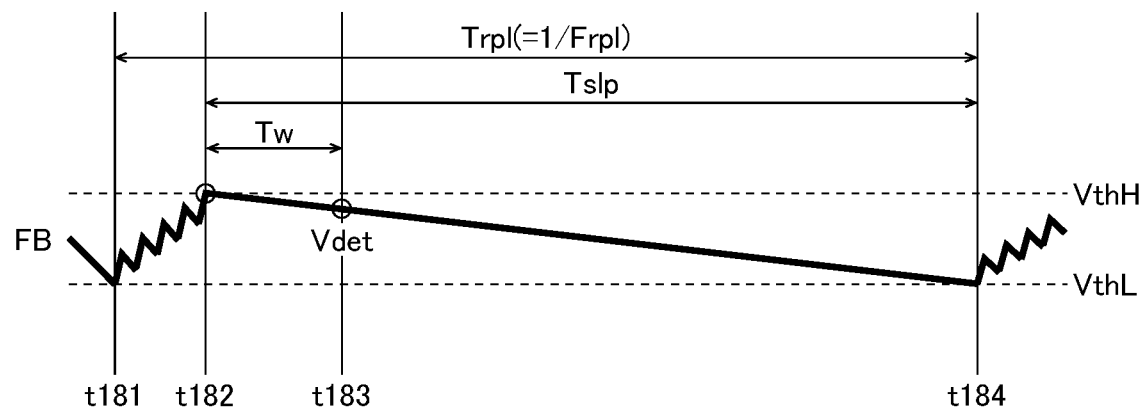
FIG. 15 is a diagram showing a first example of gradient determination.

FIG. 15 is a diagram showing a first example of the gradient determination at steps #2 and #3 in FIG. 13, depicting the feedback voltage FB.

In the gradient determination of the first example, after the driving of the switching output circuit 110 is halted at time point t182, when a predetermined standby time Tw has elapsed since, that is, at time point t183, a measured value Vdet of the feedback voltage FB is acquired. Then, by dividing the difference (=Vdet−VthH) between the high-side threshold value VthH and the measured value Vdet by the standby time Tw, the gradient M (=(Vdet−VthH)/Tw, where M<0) of the feedback voltage FB is calculated.

The steeper the gradient M thus calculated, the shorter the halt period Tslp (between time points t182 and t184) of the switching output circuit 110, and hence the shorter the ripple period Trp1 (between time points t181 and t184).

Thus, by checking whether the gradient M of the feedback voltage FB is steeper than a predetermined threshold value Mth (<0), it is possible to determine whether the ripple frequency Frp1 is higher than the human audible lower-limit frequency FL or not (falls in the human audible range or not).

Although, in the above description, for the sake of convenience, a measured value (=(Vdet−VthH)/Tw) of the gradient M is compared with a predetermined threshold value Mth (<0), in practice, the measured value Vdet of the feedback voltage FB can be compared with a predetermined threshold value Vth (=VthH+Mth×Tw).

Figure 16:
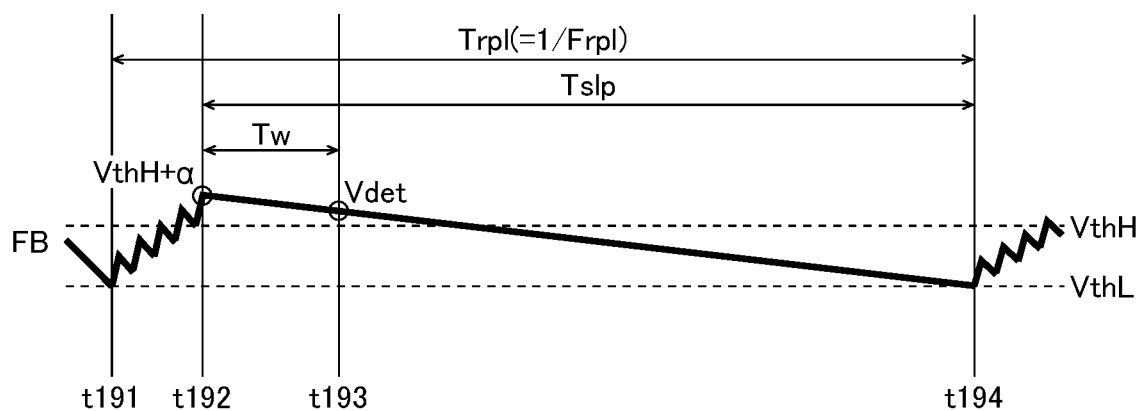
FIG. 16 is a diagram showing a second example of gradient determination.

FIG. 16 is a diagram showing a second example of the gradient determination at steps #2 and #3 in FIG. 13, depicting the feedback voltage FB.

As shown there, when, at time point t192, the driving of the switching output circuit 110 is halted, the feedback voltage FB overshoots to a not small extent (FB=VthH+α). Thus, setting the standby time Tw at an adequate length (for example, −Mth/α, where Mth<0) makes it possible to divert the high-side threshold value VthH as the above-mentioned threshold value Vth.

That is, in the gradient determination of the second example, after the driving of the switching output circuit 110 is halted at time point t192, when a predetermined standby time Tw (=−Mth/α) has elapsed since, that is, at time point t193, whether the measured value Vdet of the feedback voltage FB is higher than the high-side threshold value VthH or not is checked, and it is thereby possible to determine whether the ripple frequency Frp1 is higher than the human audible lower-limit frequency FL or not (falls in the human audible range or not).

The gradient determination of the first example (FIG. 15) or the second example (FIG. 16) can be achieved with the help of a single comparator that compares the measured value Vdet of the feedback voltage FB with a predetermined threshold value Vth, and such a configuration can be implemented easily. However, precise determination of the gradient M requires a comparatively long standby time Tw (about several tens of microseconds). This, it should be noted, causes a delay in the timing of transition to a power saving mode.

Figure 17:
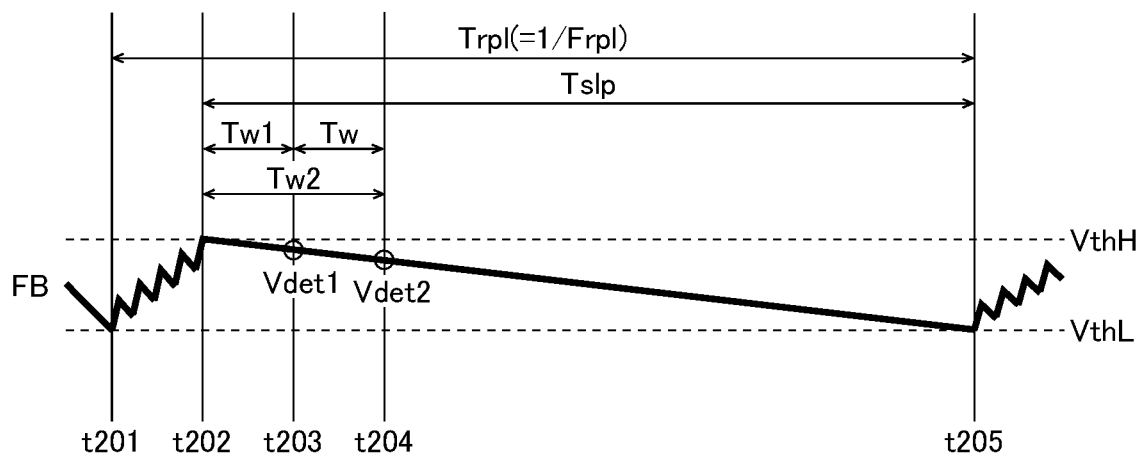
FIG. 17 is a diagram showing a third example of gradient determination.

FIG. 17 is a diagram showing a third example of the gradient determination at steps #2 and #3 in FIG. 13, depicting the feedback voltage FB.

In the gradient determination of the third example, after the driving of the switching output circuit 110 is halted, when predetermined standby times Tw1 and Tw2 (=Tw1+Tw) have elapsed since, that is, at time points t203 and t204, measurement values Vdet1 and Vdet2, respectively, of the feedback voltage FB are acquired.

Then, by dividing the difference (=Vdet2−Vdet1) between the measured values Vdet1 and Vdet2 by the standby time Tw (which is the difference between the standby times Tw1 and Tw2), the gradient M (=(Vdet2−Vdet1)/Tw, where M<0) of the feedback voltage FB is calculated.

Then, by checking whether the gradient M of the feedback voltage FB is steeper than a predetermined threshold value Mth (<0), whether the ripple frequency Frp1 is higher than the human audible lower-limit frequency FL or not (falls in the human audible range or not) is determined.

As described above, in the gradient determination of the third example, the gradient M of the feedback voltage FB is calculated precisely based on measured values Vdet1 and Vdet2 at two time points. This helps reduce the standby time Tw compared with in the first example (FIG. 15) and the second example (FIG. 16) described previously, and it is thereby possible to expedite the timing of transition to a power saving mode. It should however be noted that performing the gradient determination of the third example requires means (such as a multi-bit ADC) for acquiring the measured values Vdet1 and Vdet2 of the feedback voltage FB.

Overview

To follow is an overview of the various embodiments disclosed herein.

According to one aspect of what is disclosed herein, a switching power supply includes: a switching output circuit configured to generate an output voltage from an input voltage by charging a capacitor by turning on and off an output transistor; a control circuit configured to halt the driving of the switching output circuit when charging electric charge to the capacitor per switching event is limited to a lower limit value and the output voltage, or a feedback voltage commensurate with it, is raised from a predetermined reference voltage; and a lower limit value setting circuit configured to variably control the lower limit value during the driven period of the switching output circuit (a first configuration).

In the switching power supply of the first configuration described above, preferably, the lower limit value setting circuit is configured to increase the lower limit value with increase in the number of times of switching (a second configuration).

In the switching power supply of the first or second configuration described above, preferably, the lower limit value setting circuit is configured to increase the lower limit value with increase in the load (a third configuration).

In the switching power supply of any of the first to third configurations described above, preferably, the lower limit value setting circuit is configured to generate a lower limit value setting signal by comparing a sensed value of an inductor current passing in the switching output circuit with a predetermined reference current value (a fourth configuration).

In the switching power supply of the fourth configuration described above, preferably, the lower limit value setting circuit is configured to variably control the timing of pulse generation in the lower limit value setting signal by varying the reference current value (a fifth configuration).

The switching power supply of the fourth or fifth configuration described above preferably further includes: an error amplifier configured to generate an error signal between the output voltage, or the feedback voltage, and the reference voltage; an oscillator configured to generate an on-signal that is pulse-driven at a predetermined switching frequency; and a PWM comparator configured to generate an off-signal by comparing the error signal with a ramp signal. Here, preferably, the control circuit is configured to turn on the output transistor at the timing of pulse generation in the on-signal, and to turn off the output transistor at whichever is later of the timing of pulse generation in the off-signal and the timing of pulse generation in the lower limit value setting signal (a sixth configuration).

In the switching power supply of any of the first to sixth configurations described above, preferably, the control circuit is configured to operate in an intermittent driving mode in which the control circuit repeats driving and halting of the switching output circuit when the output voltage, or the feedback voltage, is raised from the reference voltage (a seventh configuration).

The switching power supply of the seventh configuration described above preferably further includes: a first comparator configured to generate a first comparison signal by comparing the output voltage, or the feedback voltage, with a predetermined high-side threshold voltage; and a second comparator configured to generate a second comparison signal by comparing the output voltage, or the feedback voltage, with a predetermined low-side threshold voltage lower than the high-side threshold voltage. Here, preferably, the control circuit is configured to halt the driving of the switching output circuit according to the first comparison signal, and to restart the driving of the switching output circuit according to the second comparison signal (an eighth configuration).

In the switching power supply of the eighth configuration described above, preferably, the high-side and low-side threshold voltages each have a voltage value equal to the voltage value of the reference voltage multiplied by a coefficient greater than one (a ninth configuration).

In the switching power supply of any of the first to ninth configurations described above, preferably, the switching output circuit is of a step-down, step-up, step-up/down, or inverting type (a tenth configuration).

According to another aspect of what is disclosed herein, a switching power supply includes: a switching output circuit configured to generate an output voltage from an input voltage by charging a capacitor by turning on and off an output transistor; a lower limit value setting circuit configured to set a lower limit value of charging electric charge fed to the capacitor per switching event; and a control circuit configured to operate in an intermittent driving mode in which the control circuit repeats the driving and halting of the switching output circuit when the output voltage, or a feedback voltage commensurate with it, is raised from the reference voltage by the operation of the lower limit value setting circuit. Here, the control circuit is configured to control at least one of the driving halt timing and the driving restart timing of the switching output circuit, thereby to make the ripple frequency of the output voltage in the intermittent driving mode a frequency that does not cause the capacitor to give off audible noise (an eleventh configuration).

In the switching power supply of the eleventh configuration described above, preferably, the control circuit is configured to forcibly halt the driving of the switching output circuit when, during the driving of the switching output circuit, a predetermined upper-limit time has elapsed since the previous driving halt timing (a twelfth configuration).

In the switching power supply of the eleventh or twelfth configuration described above, preferably, the control circuit is configured to forcibly halt the driving of the switching output circuit when, during the halting of the switching output circuit, a predetermined upper-limit time has elapsed since the previous driving restart timing (a thirteenth configuration).

In the switching power supply of the twelfth or thirteenth configuration described above, preferably, the upper-limit time is shorter than the reciprocal of the human audible upper-limit frequency (a fourteenth configuration).

In the switching power supply of the eleventh configuration described above, preferably, the control circuit is configured to perform gradient determination on the output voltage, or the feedback voltage FB, after halting the driving of the switching output circuit, and to determine, according to the result of the determination, whether or not to continue the driving the switching output circuit (fifteenth configuration).

In the switching power supply of the fifteenth configuration described above, preferably, the control circuit is configured to forcibly restart the driving of the switching output circuit if the gradient of the feedback voltage is steeper than a predetermined value (sixteenth configuration).

In the switching power supply of the fifteenth or sixteenth configuration described above, preferably, the control circuit is configured to enter a power saving mode in which the supply of electric power is cut off except to a circuit needed to restart the driving of the switching output circuit if the gradient of the feedback voltage is not steeper than a predetermined value (seventeenth configuration).

The switching power supply of any of the eleventh to seventeenth configurations described above preferably further includes: a first comparator configured to generate a first comparison signal by comparing the output voltage, or the feedback voltage, with a predetermined high-side threshold voltage; and a second comparator configured to generate a second comparison signal by comparing the output voltage, or the feedback voltage, with a predetermined low-side threshold voltage lower than the high-side threshold voltage. Here, preferably, the control circuit is configured to halt the driving of the switching output circuit according to the first comparison signal, and to restart the driving of the switching output circuit according to the second comparison signal (eighteenth configuration).

In the switching power supply of the eighteenth configuration described above, preferably, the high-side and low-side threshold voltages each have a voltage value equal to the voltage value of the reference voltage multiplied by a coefficient greater than one (a nineteenth configuration).

In the switching power supply of any of the eleventh to nineteenth configurations described above, preferably, the switching output circuit is of a step-down, step-up, step-up/down, or inverting type (a twelfth configuration).

OTHER MODIFICATIONS

The various technical features disclosed herein may be implemented in any other manner than in the embodiments described above, and allow for many modifications without departing from the spirit of the present invention. That is, the embodiments descried above should be understood to be in every aspect illustrative and not restrictive. The technical scope of the present invention is defined not by the description of the embodiments given above but by the appended claims, and should be understood to encompass any modifications made in the sense and scope equivalent to those of the claims.

INDUSTRIAL APPLICABILITY

The switching power supplies disclosed herein can be used as means for supplying electric power in a variety of applications

What is claimed is:

1. A switching power supply comprising:
   a switching output circuit configured to generate an output voltage from an input voltage by charging a capacitor by turning on and off an output transistor;
   a lower limit value setting circuit configured to set a lower limit value of charging electric charge supplied to the capacitor per switching event;
   a control circuit configured:
      to control a duty of the switching output circuit such that the output voltage or a feedback voltage commensurate therewith remains equal to a predetermined reference voltage and
      to operate in an intermittent driving mode in which the control circuit repeats ON/OFF driving and halting of the switching output circuit when, as a result of the charging electric charge to the capacitor per switching event being limited to the lower limit value, the output voltage or the feedback voltage deviates, by rising, from the reference voltage; and
   the lower limit value setting circuit is configured to variably control the lower limit value during an ON/OFF-driven period of the switching output circuit in the intermittent driving mode.

2. The switching power supply according to claim 1, wherein the lower limit value setting circuit is configured to increase the lower limit value with increase in a number of times of switching in the ON/OFF-driven period.

3. The switching power supply according to claim 1, wherein the lower limit value setting circuit is configured to increase the lower limit value with increase in load.

4. The switching power supply according to claim 1, wherein the lower limit value setting circuit is configured to generate a lower limit value setting signal by comparing a sensed value of an inductor current passing in the switching output circuit with a predetermined reference current value.

5. The switching power supply according to claim 4, wherein the lower limit value setting circuit is configured to variably control timing of pulse generation in the lower limit value setting signal by varying the reference current value.

6. The switching power supply according to claim 4, further comprising:
   an error amplifier configured to generate an error signal between the output voltage, or the feedback voltage, and the reference voltage;
   an oscillator configured to generate an on-signal that is pulse-driven at a predetermined switching frequency; and
   a PWM comparator configured to generate an off-signal by comparing the error signal with a ramp signal,
   wherein the control circuit is configured to turn on the output transistor at a timing of pulse generation in the on-signal, and to turn off the output transistor at whichever is later of a timing of pulse generation in the off-signal and a timing of pulse generation in the lower limit value setting signal.

7. The switching power supply according to claim 1, further comprising:
   a first comparator configured to generate a first comparison signal by comparing the output voltage, or the feedback voltage, with a predetermined high-side threshold voltage; and
   a second comparator configured to generate a second comparison signal by comparing the output voltage, or the feedback voltage, with a predetermined low-side threshold voltage lower than the high-side threshold voltage,
   wherein the control circuit is configured to halt ON/OFF driving of the switching output circuit according to the first comparison signal, and to restart ON/OFF driving of the switching output circuit according to the second comparison signal.

8. The switching power supply according to claim 7, wherein the high-side and low-side threshold voltages each have a voltage value equal to a voltage value of the reference voltage multiplied by a coefficient greater than one.

9. The switching power supply according to claim 1, wherein the switching output circuit is of a step-down, step-up, step-up/down, or inverting type.

10. A switching power supply comprising:
a switching output circuit configured to generate an output voltage from an input voltage by charging a capacitor by turning on and off an output transistor;
a lower limit value setting circuit configured to set a lower limit value of charging electric charge fed to the capacitor per switching event; and
a control circuit configured
to control a duty of the switching output circuit such that the output voltage or a feedback voltage commensurate therewith remains equal to a predetermined reference voltage and
to operate in an intermittent driving mode in which the control circuit repeats ON/OFF driving and halting of the switching output circuit when, as a result of the charging electric charge to the capacitor per switching event being limited to the lower limit value, the output voltage or the feedback voltage deviates, by rising, from the reference voltage,
wherein the control circuit is configured to control at least one of driving halt timing and driving restart timing of the switching output circuit, thereby to make a ripple frequency of the output voltage in the intermittent driving mode a frequency that does not cause the capacitor to give off audible noise.

11. The switching power supply according to claim 10, wherein the control circuit is configured to forcibly halt ON/OFF driving of the switching output circuit when, during ON/OFF driving of the switching output circuit, a predetermined upper-limit time has elapsed since a previous driving halt timing.

12. The switching power supply according to claim 11, wherein the upper-limit time is shorter than a reciprocal of a human audible upper-limit frequency.

13. The switching power supply according to claim 10, wherein the control circuit is configured to forcibly restart ON/OFF driving of the switching output circuit when, during halting of the switching output circuit, a predetermined upper-limit time has elapsed since a previous driving restart timing.

14. The switching power supply according to claim 10, wherein the control circuit is configured to perform gradient determination on the output voltage, or the feedback voltage, after halting ON/OFF driving of the switching output circuit, and to determine, according to a result of the determination, whether or not to continue ON/OFF driving of the switching output circuit.

15. The switching power supply according to claim 14, wherein
the control circuit is configured to forcibly restart ON/OFF driving of the switching output circuit if a gradient of the feedback voltage is steeper than a predetermined value.

16. The switching power supply according to claim 14, wherein the control circuit is configured to enter a power saving mode in which supply of electric power is cut off except to a circuit needed to restart ON/OFF driving of the switching output circuit if a gradient of the feedback voltage is not steeper than a predetermined value.

17. The switching power supply according to claim 10, further comprising:
a first comparator configured to generate a first comparison signal by comparing the output voltage, or the feedback voltage, with a predetermined high-side threshold voltage; and
a second comparator configured to generate a second comparison signal by comparing the output voltage, or the feedback voltage, with a predetermined low-side threshold voltage lower than the high-side threshold voltage,
wherein the control circuit is configured to halt ON/OFF driving of the switching output circuit according to the first comparison signal, and to restart ON/OFF driving of the switching output circuit according to the second comparison signal.

18. The switching power supply according to claim 17, wherein
the high-side and low-side threshold voltages each have a voltage value equal to a voltage value of the reference voltage multiplied by a coefficient greater than one.

19. The switching power supply according to claim 10, wherein the switching output circuit is of a step-down, step-up, step-up/down, or inverting type.

20. A switching power supply comprising:
a switching output circuit configured to generate an output voltage from an input voltage by charging a capacitor by turning on and off an output transistor;
a lower limit value setting circuit configured to set a lower limit value of charging electric charge fed to the capacitor per switching event; and
a control circuit configured to operate in an intermittent driving mode in which the control circuit repeats driving and halting of the switching output circuit when the output voltage, or a feedback voltage commensurate therewith, is raised from the reference voltage by operation of the lower limit value setting circuit,
wherein
the control circuit is configured to control at least one of driving halt timing and driving restart timing of the switching output circuit, thereby to make a ripple frequency of the output voltage in the intermittent driving mode a frequency that does not cause the capacitor to give off audible noise,
the control circuit is configured to forcibly halt driving of the switching output circuit when, during driving of the switching output circuit, a predetermined upper-limit time has elapsed since a previous driving halt timing, and
the upper-limit time is shorter than a reciprocal of a human audible upper-limit frequency.

21. A switching power supply comprising:
a switching output circuit configured to generate an output voltage from an input voltage by charging a capacitor by turning on and off an output transistor;
a lower limit value setting circuit configured to set a lower limit value of charging electric charge fed to the capacitor per switching event; and
a control circuit configured to operate in an intermittent driving mode in which the control circuit repeats driving and halting of the switching output circuit when the output voltage, or a feedback voltage commensurate therewith, is raised from the reference voltage by operation of the lower limit value setting circuit,
wherein
the control circuit is configured to control at least one of driving halt timing and driving restart timing of the switching output circuit, thereby to make a ripple frequency of the output voltage in the intermittent driving mode a frequency that does not cause the capacitor to give off audible noise, the switching power supply further comprises:
- a first comparator configured to generate a first comparison signal by comparing the output voltage, or the feedback voltage, with a predetermined high-side threshold voltage; and
- a second comparator configured to generate a second comparison signal by comparing the output voltage, or the feedback voltage, with a predetermined low-side threshold voltage lower than the high-side threshold voltage, and the control circuit is configured to halt driving of the switching output circuit according to the first comparison signal, and to restart driving of the switching output circuit according to the second comparison signal.

22. The switching power supply according to claim 21, wherein
the high-side and low-side threshold voltages each have a voltage value equal to a voltage value of the reference voltage multiplied by a coefficient greater than one.

* * * * *